United States Patent [19]
Rice et al.

[11] 3,756,257
[45] Sept. 4, 1973

[54] ACRYLIC COMPOSITION FOR WATER TREATMENT AND PROCESS FOR MAKING SAME
[75] Inventors: Herbert L. Rice; Arthur Cizek; Marvin O. Thaemar, all of Houston, Tex.
[73] Assignee: Magna Corporation, Santa Fe Springs, Calif.
[22] Filed: Oct. 4, 1971
[21] Appl. No.: 186,474

[52] U.S. Cl.................. 134/3, 210/58, 252/8.55, 252/82, 252/85, 252/180, 252/181
[51] Int. Cl............................................. C23g 1/02
[58] Field of Search.................. 250/181, 180, 85, 250/82, 8.55; 134/3

[56] References Cited
UNITED STATES PATENTS
3,575,868   4/1971   Galvin et al. ...................... 252/181
3,293,152   12/1966   Herbert et al. ...................... 203/7

Primary Examiner—George F. Lesmes
Assistant Examiner—William R. Dixon, Jr.
Attorney—Bertram H. Mann et al.

[57] ABSTRACT

This invention relates to an acrylic composition; a process for obtaining the acrylic composition; to the use of such composition to remove and/or inhibit scale formation in water treatment apparatuses, oil and gas wells, producing formations, and other scale-containing or -attracting surfaces. Said novel composition is formed from about 80 to 90 parts by weight acrylic acid, about 7 to 15 parts by weight thioglycolic acid, and about 1.5 to 5 parts by weight ammonium persulfate.

10 Claims, No Drawings

ACRYLIC COMPOSITION FOR WATER TREATMENT AND PROCESS FOR MAKING SAME

This is a division of application Ser. No. 851,085, filed Aug. 18, 1969, now U.S. Pat. No. 3,665,035.

BACKGROUND OF THE INVENTION

1. Field of the Invention

This invention relates to a process for making an acrylic composition for use in water treatment apparatuses, oil and gas wells, producing formations, and other scale-containing or scale-attracting surfaces by utilizing acrylic acid, ammonium persulfate, and thioglycolic acid. The composition is formed by reacting the starting materials in a one or multistage process so that the composition produced effectively prevents the crystallization of hard water ions in calcium, magnesium and barium scaling environments.

2. Description of the Prior Art

Acrylic acid has long been known to the art as a satisfactory monomer for polymerization to obtain polymer compounds used to treat scaling systems such as boilers, evaporators, and the like. However, these polymer compounds treat the systems by making sludge and scale easy to remove from the system by modifying precipitates, by producing a film on scale-attracting surfaces, or by making non-adherent scale or sludge. These polymer compounds treat the system by rendering the sludge and scale easy to remove from the system by continuous treatment which produces an undesirable film, sludge, or insoluble precipitate. Until the discovery of the present invention, no method had been known to the art to obtain acrylic compositions with performance characteristics such that the product objected could be used either to descale water treatment apparatuses and the like as well as to inhibit scale formation on the internal linings of these vessels or other scale-attracting surfaces. Moreover, no acrylic composition has been known to the art which can be used to both descale fouled surfaces through continuous treatment and thereafter be used to inhibit scale crystallization growth. The fact that the composition of the present invention will not produce an undesirable film on treated surfaces is a particularly advantageous and novel quality over those of the compositions of the prior art.

Ammonium persulfate as a common inorganic chemical has long been known to the art for polymerization and other uses. Also, thioglycolic acid as a chain transfer agent has been used in the production of methacrylates. Yet until the discovery of the present invention, the art did not know of a method to obtain acrylic compositions as hereinafter described using acrylic acid and thioglycolic acid in conjunction with ammonium persulfate in a rapid reaction so that the resulting composition effectively prevents the crystallization of hard water ions in scaling environments.

It is an object of this invention to provide an acrylic composition having utility in preventing normal hard water scale formation on scale-attracting surfaces.

It is a further object of this invention to provide a process for inhibiting hard water scale formation on scale-attracting surfaces by utilizing an acrylic composition at relatively low ppm levels.

It is also an object of this invention to provide a process for descaling scale-attracting surfaces by utilizing an acrylic composition.

It is a further object of this invention to provide an acrylic composition that can be used to descale a surface and thereafter used to inhibit scaling.

It is a further object of this invention to provide a process for making an acrylic composition which may be used to inhibit calcium sulfate and calcium carbonate scale crystallization.

Other objects and advantages of this invention will be apparent from the following description, examples, and claims.

SUMMARY OF THE INVENTION

The acrylic composition produced by reacting acrylic acid, thioglycolic acid, and ammonium persulfate is complex in nature. The claimed composition is produced by a combination of the processes of polymerization, telomerization, oligomerization, isomerization, condensation, and free radical fragmentation effects. Thioglycolic acid itself acts as a chain transfer agent in polymerization. In addition, it undergoes a variety of chemical reactions as a reducing agent, especially as employed in the present invention. Its oxidized fragments are capable of reacting with acrylic acid and/or free radical fragments produced in the system by the rapid reactions that are obtained. A small amount of esterification of the thiol moiety of thioglycolic acid has been observed.

The process for obtaining the acrylic composition utilizes the simultaneous reaction of an acrylic acid in the presence of thioglycolic acid and ammonium persulfate at temperatures ranging from about room temperature to about 80° C. The reaction is exothermic and it is normally conducted in a solution. It has been found that any solvent or solvent system may be used which will dissolve the reactants without reacting in any substantial amount with the reactants or with the composition of this invention. For example, water, ethylene glycol and dimethyl formamide have been used as solvents in the production of acrylic compositions of this invention. An aqueous solvent system is presently preferred for economy and convenience.

Upon initiation of the reaction by temperature or mutation catalyst, the quantities of thioglycolic acid and ammonium persulfate employed in the process react instantly with one another and with acrylic acid, causing an exotherm to occur. The reaction occurring among the ingredients is complete within one to five minutes as measured by lack of volatile matter in determining the total solids content on a sample of product using a moisture balance or a vacuum oven at 100° C with a 25-inch vacuum. Oxygen dissolved in the aqueous reaction medium, or other solvent medium, need not be removed by purging the system by nitrogen or by other means.

The presently preferred starting material is any grade of commercially available glacial acrylic acid. Acrylic acid containing 200 parts per million of methylether of hydroquinone inhibitor may be used and it is preferred that higher concentrations of inhibitor not be used, but the amount of inhibitor in the acrylic acid is not critical to the present invention. The amount of acrylic acid to be reacted in a single reaction stage to produce the acrylic composition of the present invention may range from about 5 percent to about 30 percent by weight of the total solvent system (including reactants). The actual amount depends on the cooling process available for control of the reaction exotherm. If no cooling is available, it is preferable to react 5 to 10 percent of acrylic acid by weight of the total solvent system. If cooling water is available somewhat more acrylic acid may be reacted. If refrigerated cooling is available, amounts of acrylic acid from about 25 to 30 percent by weight of the solvent system may be reacted successfully. By incremental additions of any desired number of aliquot portions of the reactants whereby each successive addition made after the preceding incremental addition has completed its reaction a relatively higher proportion of reactants to solvent may be used without difficulty in controlling the temperature. The amount of solvent used for either single stage or multistage reactions is not critical, but will normally be above about 330 parts by weight for 100 parts acrylic acid used. If desired, much higher amounts of solvent may be used, but as more solvent is used the solids content of the acrylic composition (including solvent) will be reduced. Normally, a high solids liquid product is desired.

The amounts of thioglycolic acid and ammonium persulfate to be reacted are conveniently determined by the charge weight or amount of acrylic acid used. An amount of thioglycolic acid obtained as a 98 percent pure vacuum distilled material may be used in an amount ranging from about 10 percent to about 15 percent by weight of the acrylic acid. However, about 12 percent by weight thioglycolic acid based upon the weight of acrylic acid is presently preferred. The ammonium persulfate used in the preparation of the acrylic composition is preferably a commercially available technical grade of ammonium persulfate. About 2 to 5 percent by weight ammonium persulfate based upon the weight of acrylic acid may be used, and about 4 percent of this reactant is preferred. Preferred acrylic compositions have been prepared by utilizing all of the ammonium persulfate at the onset of the reaction. However, it has been found that incremental additions of this reactant with each charge of acrylic acid are equally effective.

The process involves an oxidation-reaction (redox) reaction which may require catalytic initiation. If the reaction process is to be conducted at room temperature, the use of from about 5 ppm to about 30 ppm of a catalytic ion, such as ferric, ferrous, or cupric, will be required. If starting temperatures of 50° C or more are used, enough energy is present in the system to activate the reaction without recourse to the use of a catalytic ion. Ammonium persulfate will generally serve as the initiator at high temperatures. It has been found that if either ammonium persulfate or thioglycolic acid are absent, or are not present in the amounts claimed in this invention, regardless of whether an amount of catalytic ion is present at any temperatures, the acrylic composition of this invention will not be produced.

If the solids content of the above described acrylic composition is low because, for instance, natural atmospheric cooling or cooling water were employed with a low starting concentration of acrylic acid, then the solids content may be raised to an economical level by boiling the solution to remove water, or by a flash condensation or evaporation process. As previously noted, any nonreactive solvent may be used, but it is presently preferred to utilize the entire acrylic composition as an aqueous inert solvent system. A fresh charge of acrylic acid, thioglycolic acid, and ammonium persulfate is weighed into the system in the preferred amounts used to prepare the initial low solids acrylic composition, and the reaction is carried out exactly as above described. This type of staging process may be repeated again with the addition of another charge of reactants, or successive charges may be added until the acrylic composition solids level is raised as high as 35 to 40 percent of the total system.

The acrylic composition of this invention prepared by the reaction described herein is effectively utilized for scale prevention and descaling. This aqueous acidic composition is a relatively non-viscous Newtonian fluid which dissolves in surprisingly high concentrations of electrolytes. It has been found that practical (2 percent by weight) concentrations of this acrylic composition are soluble in sodium chloride and calcium chloride brine of over 20 percent activity by weight. If desired, the solvent may be evaporated to produce an amorphous, glass-like brittle solid which can be reduced to a powder. The solid is readily soluble in water. A neutralized form of the acrylic composition is presently preferred to avoid problems of handling the corrosive acid form. Solvent may also be removed from this product to obtain a dry powder.

The composition of the present invention is the reaction product of about 80 to 90 parts by weight acrylic acid; about 7 to 15 parts thioglycolic acid and about 1.5 to 5 parts ammonium persulfate. The presently preferred acrylic composition is the reaction product of about 86 parts by weight acrylic acid; 10.5 parts by weight thioglycolic acid; and 3.5 parts by weight ammonium persulfate. Preparations of the acrylic composition of this invention have been found to have a number average molecular weight in the range 500 to 1,000. Molecular weight was determined using an Hitachi Perkin-Elmer Model 115 Vapor Pressure Osmometer. A sample of acrylic composition is evaporated to dryness and dissolved in N,N-Dimethylformamide, then filtered to remove inorganic residuals. This solution is made to a known concentration. The imbalance of two thermistors is measured across a pair of thermistor beads calibrated on a series of varying concentrations of benzil (MW 210) in the same solvent at main oven setting of 55° C, and sub-oven setting of 50° C. Typically, this acrylic composition at a level of 25 to 30 percent solids by weight will have a pH of about 2 and a viscosity ranging from about 6 cp to about 12 cp. As used herein, viscosities are usually determined at 25° or 30° C using a Fann Viscometer rotating at 300 rpm. The measurement depends on torque forces supplied to a stationary suspended cylinder within a larger concentric cylinder shearing a liquid in contact with both cylinders at a given shear rate. For the reason that a viscosity value loses significance as an indication of molecular weight in the molecular weight range of 500 to 1,000, it is deemed preferable to designate the present acrylic composition as a polyfunctional electrolyte or as a low molecular weight polyelectroltye of complex chemical character. In fact, if the acidity of this acrylic composition is neutralized to at least 70 percent based on acrylic content and the resulting solution is diluted to 6.5 percent solids, a measurement of only 1.16 centistokes is obtained at 30° C on a Fann Viscometer. This value is not much greater than a solution of ordinary electrolyte in water would have, or of water alone.

The acrylic composition produced by the process described herein is acidic and begins to precipitate a complex low molecular weight sulfur bearing fraction due to crystallization when the acidic solution ages for several days at room temperature. To avoid this and to render the acidic acrylic composition less corrosive for practical use purposes, it is preferred that the acidity of the composition be neutralized. This procedure in no way detracts from the scale inhibiting or descaling performance of the acrylic compositions of the invention. Convenient alkaline materials suitable for the neutralization procedure may include sodium, potassium, or ammonium hydroxide, and mono, di, or tri alkanolamines, and the like.

In the use of this acrylic composition for the control of scale formation, the precise amount of the agent required for removal of scale or inhibition of scale will vary depending on the quantity and nature of the solids contained in the system to be treated. Without limiting the generality of the foregoing, it has been observed that the quantity of the composition of the present invention required for scale removal will usually be at least about 20 ppm whereas scale inhibition can be achieved at from about 1 to 10 pm.

PROCESS FOR PREPARATION OF OUR ACRYLIC COMPOSITION

Although other types of reactors may be utilized in the preparation of the acrylic composition, it has been found that a batch reactor obtains very satisfactory results. This reactor is a jacketed pressure vessel with individual inlets for the acrylic acid, ammonium persulfate, and thioglycolic acid reactants. The reactor contains a turbine agitator which insures complete mixing of the reactants. The initial reaction temperature is maintained by the addition of steam and cooling water to the reactor jacket. During the reaction each reactant is added in regularly prescribed sequences through individual charge lines. The preweighed acrylic acid and reaction dilution water are charged to the reactor by means of pumps and are brought to reaction temperature through the application of steam to the reactor jacket. Two charges of concentrated ammonium persulfate and one charge of thioglycolic acid are prepared for reaction and are placed in appropriate charge pots located above the reactor vessel. Each reactant is added in sequence below the solution surface by means of individual pressurized charge lines.

The initial stage of the manufacturing process entails the use of deionized dilution water, acrylic acid solution, thioglycolic acid, and ammonium persulfate. The solution water is loaded through the top of the reactor vessel and is heated to about 170° F.

After the water in the reactor is heated to about 170° F, the acrylic acid solution is added to the reactor through the manifold; and the temperature of the aqueous solution in the reactor will cool to about 158° F. After the acrylic acid load has been completed, the thioglycolic acid charge pot should have an increased pressure of between 40 psi and 50 psi, and the charge pot is opened to introduce the thioglycolic acid into the reactor. This pressure is needed to increase the pressure of low points in the thioglycolic reducing agent line in order to place all of the thioglycolic acid into the reactor. After the ammonium persulfate charge pots have obtained a pressure of between 40-to-50 psi and the reaction solution has cooled to about 158° F, the initial ammonium persulfate charge pot is opened, releasing the additive into the reactor vessel. The temperature should increase sharply to about 190° F. Generally, this increase in temperature should occur within one minute after the addition of the initial amount of ammonium persulfate. An additional amount of ammonium persulfate is then placed into the reactor, causing a peak temperature between about 200° F and about 210° F. This additional amount of ammonium persulfate assures complete reaction of all of the acrylic acid solution.

Although neutralization of the acrylic composition is not essential in order to obtain satisfactory inhibition and descaling of metal or other surfaces, it has been found that partial and complete neutralization will lower corrosivity and yield a product not dangerous to handle. To obtain a neutralized product, a final stage, as described earlier, can be initiated which will entail the use of sodium hydroxide or the like as a neutralizing agent. This stage is begun when the acrylic solution has cooled to a temperature of about 150° F or less. The amount of neutralizing agent depends on whether the acrylic composition is to be partially neutralized, completely neutralized, or neutralized over 100 percent, based on acrylic acid stoichiometry. The neutralizing agent should be added slowly in order to prevent the formation of steam. The small amount of water lost in this step may be replaced as desired.

USES OF THE ACRYLIC COMPOSITION OF THE PRESENT INVENTION

Seawater and brines contain many scale-producing substances which will contain forms of calcium and magnesium ions. These substances will become affixed to the internal surfaces of desalination units to transpose seawater or brines into purified water for human consumption. Heat transfer in desalination evaporators is greatly reduced as the scale deposit increases, thus causing less efficient desalination and the requirement of increased energy used to obtain continuous high desalination temperatures and production in the evaporator. The acrylic composition of the present invention, especially the sodium salt, has been found to be an excellent scale inhibitor and descaler when placed into the water used in these evaporators. No films have been observed on equipment surfaces after treatment with our acrylic composition.

The composition made from the above described process has extremely unique and novel qualities unobtainable in polyacrylic acid compositions of the prior art. For example, the composition of the present invention will act as a descaler of metal surfaces containing adhering calcium sulfate and calcium carbonate scale deposits. This can be achieved in periods from about 15 minutes to about 45 minutes, depending on the concentration of the acrylic composition utilized and the general characteristics of the scale metal surfaces. Tests have indicated that satisfactory descaling can be achieved using about 3 percent acrylic composition solution for calcium sulfate scale and about 2 percent acrylic composition solution for calcium carbonate scale. The descaled surfaces have been found to be completely void of organic and inorganic solids after treatment with the composition of the present invention. Furthermore, it has been found that concentrations of as low as 25 ppm in continuous feed systems will descale scaled surfaces over a period of 2 or 3 weeks.

Another example of the composition's unique qualities is its sald inhibition characteristic. Generally, scale inhibition can be obtained using as little as 1 ppm of the acrylic composition, depending on the severity of the scaling situation. Usually no more than 50 ppm will be required in the most severe case. It has also been found that acrylic composition solutions that have been previously utilized in descaling treatment are as effective as fresh acrylic composition solutions when utilized in dilute quantities as a scale inhibitor. Versenates and ordinary calcium and magnesium ion chelating agents may be used to descale surfaces but cannot be used to inhibit scale crystallization before or after such use.

Still another example of the unique qualities of the acrylic composition of the present invention is its ability to remove calcium carbonate scale from unheated pipe and subsurface oil, gas, and water well pumps by batch, squeeze, and continuous injection methods. It will also remove scale from formation surfaces allowing increased production in oil, gas, or water wells. It will also permit lower injection pressures and provide greater efficiency in the operation of disposal wells.

It is understood that this invention to produce an acrylic composition for inhibiting or removing calcium scale does not limit itself to this type of scale alone. This acrylic composition may be used to treat water containing other troublesome ions which may be present in the system and cause scale to form in water systems, mineral systems found in the petroleum industry, or elsewhere. For example, the composition of this invention may be used to remove or inhibit scale produced by a mixture of water containing barium ions with water containing sulfate ions. The composition of this invention may also be used to treat waters high in magnesium sulfate or magnesium carbonate content.

The following examples will further describe the novel qualities of the process, composition, and use of the present invention:

EXAMPLE I

A one stage process was utilized to make the acrylic composition of the present invention percent ammonium persulfate based using 537.6 grams of deionized water charged into a beaker fitted with a mechanical stirrer. The beaker was heated to about 75°C. Two hundred twenty-five grams of an aqueous 90.9 percent acrylic acid solution, calculated to produce a final acrylic acid concentration of 25.2 percent, was added. The beaker was then placed into an ice bath. Twenty-four and six-tenths grams of thioglycolic acid was then added to the aqueous acrylic acid solution. When the temperature of the reactants reached 50°C, 23 grams of an aqueous 33.3 percent ammonium persulfate solution (3.75 percent ammonium persulfate based on acrylic acid) was added. An instant reaction was observed, and it was essentially complete within five minutes. After an increase in temperature, the beaker contents temperature was allowed to drop to about 40°C, at which point heat was applied to raise the temperature to 65°C in order to insure complete reaction of the beaker contents. The aqueous product had a Fann viscosity of 7 cp at 30°C and a solids content of 29.0 percent.

A 405.1 gram sample of this composition was placed in a beaker and neutralized to a pH of 7.0 by incremental addition of 62.2 grams of sodium hydroxide. This neutralized product had a Fann viscosity at 30°C of 25 cps and a solids content of 34.4 percent.

EXAMPLE II

The acrylic composition of the present invention was made by first placing 537 grams of deionized water into a reaction vessel, which was stirred continuously and heated to a temperature of over 75°C. A charge of 75 grams of an aqueous solution of 90.9 percent acrylic acid was then placed into the vessel. This charge was followed by an 8.2 gram charge of thioglycolic acid. One-half minute after the addition of the thioglycolic acid, a 5.8 gram addition of an aqueous 33.3 percent ammonium persulfate solution was placed into the vessel. This addition caused an immediate exotherm, raising the reactant temperature to over 90°C. A 1.9 gram addition of an aqueous 33.3 percent ammonium persulfate solution was then placed into the vessel. The vessel contents were allowed to cool to 70°C. After sufficient cooling, the second of the three 75 gram charges of an aqueous 90 percent acrylic solution was placed into the vessel, resulting in a temperature decrease to 65°C. Another 8.2 gram thioglycolic acid charge was made which was followed one-half minute later by a charge of 5.8 grams of an aqueous 33.3 percent ammonium persulfate solution. An exothermic reaction occurred which caused an increased temperature to about 83°C. Before cooling commenced, a 1.9 gram charge of the aqueous 33.3 percent ammonium persulfate solution was added. The vessel contents were allowed to cool to a temperature of about 70°C. A final 75 gram charge of an aqueous 90.9 percent acrylic acid solution was placed into the vessel, which lowered the temperature to 65°C. A final addition of 8.2 grams of thioglycolic acid was added to the vessel contents followed 30 seconds later by 5.8 grams of an aqueous solution of 33.3 percent ammonium persulfate, resulting in an exothermic reaction and a temperature of about 80°C. A final solution of 5.8 grams of an aqueous 33.3 percent ammonium persulfate solution was placed into the vessel. This acrylic composition has a sand-bath activity solids content of 28.7 percent and a viscosity of 7 cps at 30°C as determined by a Model 39A Fann Viscometer.

EXAMPLE III

Forty grams of a glacial acrylic acid (200 ppm methyl ether of hydroquinone inhibitor) was added to 400 grams of deionized water in a beaker, and 0.2 cc of a 6 percent solution of $FeCl_3$ was added to provide about 10 ppm $Fe^{+++}$. Six grams of thioglycolic acid (Evans 98 percent vacuum distilled) was added to provide about 15 percent based on the acrylic acid charge weight. Eight grams of a 10 percent solution of ammonium persulfate was added to the beaker incrementally at room temperature to give an amount of ammonium persulfate equal to 2 percent based on the acrylic acid charge weight. A reaction exotherm of 19°C was obtained over a 5-minute period. The beaker was allowed to cool to room temperature. A fresh charge of acrylic acid in an amount of 8.8 percent of the weight of the beaker contents was then added, followed by another charge of thioglycolic acid equal to 15 percent of the weight of the incoming charge, and 2 percent of the ammonium persulfate based on the new acrylic charge was added. No more catalyst ion was needed. After cooling the beaker contents, the procedure was repeated again with 10 percent of acrylic acid based on the new beaker contents, and 15 percent thioglycolic acid and 2 percent ammonium persulfate based on the acrylic charge.

The solids content of the acrylic composition was 26.5 percent by weight and the viscosity was less than 10 cp. The total charge weight was neutralized to a pH of 6.5 with 76 grams sodium hydroxide pellets. This neutralized composition then contained 30 percent total solids by weight and its viscosity was 29 cp as measured at 23°C at 300 rpm on a Fann viscometer.

EXAMPLE IV

Acrylic acid was reacted in a single stage reaction at 7 percent based on the weight of the total aqueous system. The amounts of thioglycolic acid (TGA) and ammonium persulfate (AMPS) used are shown in the table below. The reaction was repeated utilizing 7 percent acrylic acid by weight of the system three additional times to get a level of final solids shown in the tables below. This multistage reaction was conducted in the manner set forth in Example II. The products were evaluated in a performance test described following the table below:

| | % TGA[1] | % AMPS[1] | Temp.[2] | Final solids of composition | viscosity | performance |
|---|---|---|---|---|---|---|
| A. | 12 | 4 | 60°C | 28.1% | 6.5 cp | no scale[3] |
| B. | 8 | 4 | 60°C | 27.2% | 9 cp | scale [4] |
| C. | 6 | 4 | 60°C | 26.6% | 12 cp | scale [4] |
| D. | 10 | 4 | 60°C | 27.6% | 7.5 cp | no scale[5] |

(1) Based on acrylic charge weight.
(2) Starting temperature of reaction.
(3) No gypsum crystals with 1.7 ppm of actual solids of acrylic composition.
(4) Gypsum crystals observed with 2.5 ppm of actual solids of acrylic composition.
(5) No crystals with 2.2 ppm actual solids of acrylic composition.

A standardized $CaSO_4 \cdot 2H_2O$ scaling performance test was used to establish the value of the acrylic composition in preventing scale formation in a scaling environment. The test was run by preparing two solutions. Solution A was 20 percent by weight sodium chloride and 21,900 mg/l $CaCl_2 \cdot 2H_2O$. Solution B was 20 percent by weight sodium chloride and 20,900 mg/l $Na_2SO_4$. When equal volumes (100 cc) of these solutions were mixed, a calcium sulfate solution of about 9,900 mg/l and 20 percent sodium chloride was obtained. When this calcium sulfate solution without a scale inhibitor is placed in an oven for 24 hours so that the liquid temperature becomes 70°C, at least about 3,000 mg/l of calcium sulfate will precipitate as $CaSO_4 \cdot 2H_2O$ crystals by the end of the test period.

The aqueous acrylic composition described in the above table was diluted to about 1% by volume in deionized water to allow convenient dispensing of small quantities of test material to the calcium sulfate system. A quantity of the 1% test chemical solution was then added to Solution A so that when mixed with an equal volume of Solution B, a concentration of about 2 ppm or less of active inhibitor solids was present in the calcium sulfate solution. In this test $CaSO_4 \cdot 2H_2O$ crystals were observed in abundance when 25 ppm sodium hexametaphosphate, a common scale inhibitor, is present. Both preparations of the acrylic composition of this invention prevented $CaSO_4 \cdot 2H_2O$ crystals from forming in this test when present at about 2.2 ppm or less of total solids in the treated water. This is given by runs A and D.

It will be noticed that in this Example two of the runs, B and C in the table above (8% TGA, 6% TGA) are not within the limits of the claims of this invention and do not prevent crystallization of $CaSO_4 \cdot 2H_2O$ at levels of concentration which were higher than the concentrations used in test runs A and D.

EXAMPLE V

Acrylic acid was reacted in three stages—at 10.7 percent, 9.5 percent, and 8.5 percent respectively, based on the total charge weight of the system to obtain the level of final solids as shown in the following table. At each stage, the amounts of thioglycolic acid and ammonium persulfate used were based on acrylic acid charge as shown in the table. The reaction was conducted as described in Example II. The products were then evaluated in the scaling performance test as described in Example IV. It is seen that the runs made within the claimed composition range will prevent gypsum crystals from forming under the test conditions.

| | % TGA[1] | %AMPS[1] | Temp.[2] | Final solids of Composition | Viscosity | perform mance[3] |
|---|---|---|---|---|---|---|
| A. | 14 | 4 | 70° C | 29.7% | 6.5 cp | No scale[4] |
| B. | 12 | 4 | 70° C | 29.4% | 7.5 cp | No scale[4] |
| C. | 10 | 4 | 70° C. | 28.9% | 9.0 cp | No scale[4] |
| D. | 8 | 4 | 70° C | 28.3% | 10.5 cp | Scale[5] |
| E. | 6 | 4 | 70° C | 27.9% | 13.0 cp | Scale[5] |

(1) Based on acrylic charge weight.
(2) Starting material.
(3) When all runs were neutralized to pH 7 and retested using the performance test, the same results were achieved based on total solids content discounting the sodium hydroxide contribution.
(4) No gypsum crystals observed with 1.7 ppm actual solids, or less, of acrylic composition.
(5) Gypsum crystals observed at 1.7 ppm actual solids of treating agent.

EXAMPLE VI

Two 115 v heating elements were inserted into two beakers containing 250 ml of 1,900 ppm calcium sulfate and 480 ppm calcium carbonate, respectively. The scaling solutions were maintained at 250 ml by replacing the evaporated solution with saturated scaling solution until 125 ml of the saturated scaling solution has been added. During the heating process, scale formed on both heating elements. After scale formation on the probes, the scale solutions were filtered. The neutralized acrylic composition (i.e., solutions containing 34.4 percent total solids including calcium ion) formed as in Example I was prepared and added to the filtrate while being heated to 180°F. The probes were then reinserted and heated. Results of these tests indicate that the acrylic composition of the present invention will effectively treat scaled metallic surfaces at various ppm levels and concentrations. The following tables contain relevant data concerning these tests:

Descaling of Calcium Carbonate Scaled Probes
Starting Fluid     Results
           Heated Probe
neutralized

| $CaCO_3$ | ppm | ml | acrylic composition ppm(soln) | Appearance | Removal Time (min.) |
|---|---|---|---|---|---|
| A. | 440 | 500 | blank run | Scale | - |
| B. | 126 | 250 | 10,000 | Scale* | - |
| C. | 126 | 250 | 20,000 | Clean | 33 |
| D. | 126 | 250 | 30,000 | Clean | 25 |
| E. | 126 | 250 | 40,000 | Clean | 21 |
| F. | 38 | 250 | 50,000 | Clean | 5 |
| G. | 456 | 250 | 30,000 | Clean | 20 |

*Scale on probe after two hours at 180°F; however, solution is clean.

After standing overnight at room temperature, the probe was completely descaled.

Descaling of Calcium Sulfate Scaled Probe

| Starting fluid | | | Results | |
|---|---|---|---|---|
| | | Neutralized acrylic | Heated Probe | |
| | CaSO$_4$ ppm | composition ml ppm(soln) | Appearance | Removal Time (min.) |
| A. | 1900 | 250 blank run | Scale | - |
| B. | 2180 | 300 10,000 | Scale* | - |
| C. | 2180 | 300 20,000 | Clean | - |
| D. | 2180 | 300 30,000 | Clean | 20–30 |
| E. | 2180 | 300 40,000 | Clean | 10–20 |
| F. | 2180 | 300 50,000 | Clean | 5–10 |

* Scale on probe after 30 minutes at 180° F; however, solution is clean. Solution was cooled to room temperature and probe placed back into solution overnight. Scale sloughed off probe in about 2 hours and went into solution within 18 hours.

EXAMPLE VII

Scale inhibition following descaling was shown through the utilization of descaling solutions of Example VI in the performance test described in Example IV. It was found that an equivalent concentration of a neutralized acrylic composition like that shown in Example I produced scale inhibition when fresh or when previously used for descaling. Thus, the composition of the present invention may be used to descale a surface and then reapplied to inhibit scale crystallization.

Calcium sulfate descaling solutions of Example VI initially containing 20,000 and 40,000 ppm (2 percent and 4 percent, respectively) of the acrylic composition (neutralized solution) were also evaluated for use in calcium sulfate scale control after use in the descaling described in Example VI. The performance tests were conducted as described as in Example IV and compared with fresh acrylic composition (neutralized solution) at equivalent concentrations.

The following table illustrates the excellent inhibition characteristics of the acrylic composition of the present invention:

| Treating Composition | Amount of Acrylic Composition (Solution) In Treated water PPM | Observation |
|---|---|---|
| 4% | 6 | No scale |
| 4% | 8 | No scale |
| 4% | 10 | No scale |
| 4% | 12 | No scale |
| 4% | 14 | No scale |
| 2% | 6 | Trace scale |
| 2% | 8 | No scale |
| 2% | 10 | No scale |
| 2% | 12 | No scale |
| 2% | 14 | No scale |
| Acrylic composition* | 6 | Trace scale |
| Acrylic composition* | 7 | No scale |
| Acrylic composition* | 8 | No scale |
| Blank | 0 | Scale |

* Neutralized solution containing 34.4% solids including sodium.

EXAMPLE VIII

Scale inhibition characteristics of the acrylic composition of the present invention were evaluated by treating a multi-effect evaporator used to recover spent sulfite liquor. The aqueous medium used in this evaporator has been characterized as scaling 20 times greater than seawater. The evaporator contained a multinozzle spray system at the top containing the dilute sulfite liquor. Dry steam was circulated into the internal evaporator body and was ejected as wet steam after circulation. The concentrated spent sulfite liquor was cycled out of the evaporator through connections at the bottom of the vessel. A blank run indicated that scaling occurred within six hours after run initiation. The evaporator was then treated with a five ppm solution of the acrylic composition as in Example I. After six hours of run time, no scale had deposited on the metal sides of the boiler, and only slight traces of scale could be found after over 22 hours of continuous evaporation.

EXAMPLE IX

Scale inhibition characteristics of the neutralized acrylic composition made as in Example I were observed through utilization of the composition in a 7,250 gallon per day seawater distillation unit at Elbo Key, Bahamas. This unit had previously been operated only for short runs because of the necessity for frequent acidation to remove accumulated scale. An analysis of the predistilled seawater indicated the following:

Total solids: 38,960 ppm
Sodium chloride and calcium chloride: 33,150 ppm
Bicarbonate Hardness: 178 ppm
Total Hardness: 2,450 ppm A 24 ppm injection of the acrylic composition was placed in the seawater prior to the distillation process for 4 days. This ppm level was then reduced to 10 ppm for a period of 3 days. No scale crystallization of any kind was detected after several weeks' observation. Tests similar to those initiated at Elbo Key, Bahamas, were run on a desalination unit in Atingua, using only 3 ppm of the acrylic composition for effective scale inhibition. No scale crystallization was observed during the 3 weeks' test period.

EXAMPLE X

Tests were run to determine the effectiveness of the neutralized acrylic composition as described in Example I as an inhibitor as well as a descaler of calcium carbonate scale on surface scaled oil well pumps. on scale Ten gallons of water were placed in the annulus of an oil well in order to wet the casing head for the addition of the acrylic composition. Ten gallons of the acrylic composition were then placed into the well. This injection was followed by 45 gallons of water in order to thoroughly wash the acrylic composition down the pipe. A beam-type chemical pump was placed into the well's annulus and the injection line was tied down. The acrylic composition was then mixed in a 1-to-4 acrylic composition-water ratio in the chemical pump reservoir. After 24 hours of pumping, the pump was examined for scale. The pump was found to be completely free of all accumulated scale of the internal metal surface. This pump had a previous scal history which necessitated pulling the pump for acidation every 20 to 30 days, which in turn necessitated costly well shut-downs.

The diluted acrylic solution used to descale was then recovered and was used to inhibit scale crystallization continually in 6 ppm quantities. This pump was inspected from time to time for several months and was found to be completely void of calcium carbonate and calcium sulfate scale crystallization at all times.

EXAMPLE XI

Descaling of surfaces containing calcium carbonate scale with the composition of the present invention was demonstrated by treating a water disposal well. This well had a previous history of constant scale-up, scored plungers, and formation plugging. A 25 ppm treatment with the neutralized composition as in Example I was placed on the suction side of the disposal pump. For the first two weeks of continuous treatment, water containing white solids was produced. Treatment was continued for three months. The system was then examined and was found spotless, containing no scale. The composition of the present invention had completely removed all scale crystallization from the internal lining of the metallic pipe, and no formation damage occured as a result of this treatment.

EXAMPLE XII

A steam generating boiler normally using deionized water to prevent fouling was converted to Houston, Texas tap water of 135 ppm hardness. The feed water was treated with 3 ppm of a neutralized aqueous acrylic composition of the type described in Example I, resulting in a level of about 1 ppm of active solids. The boiler was operated successfully for an arbitrary test period of 32 hours at a feed rate of 80 gallons per hour at 235 lbs./sq.in. and 340° F. No adverse effects were observed in operation, nor was scale crystallization observed at the end of the test period.

EXAMPLE XIII

Two 75 horsepower, low-pressure boilers were operated successfully for over six months at 24 hours per day without scaling of the equipment and without the need for standard sludge blowdown treatment. This was made possible by maintaining a level of 5 ppm to 10 ppm of our neutralized aqueous acrylic composition of the type described in Example II. The boiler systems were essentially closed, requiring only 10–15 percent makeup of Dallas, Texas tap water of about 230 ppm hardness and operating at 10 psi with steam temperature of about 240°–250°F. Solids in the boiler were maintained below 3,000 ppm, preferably below 2,300 during the test. In effect, the use of our aqueous acrylic composition permitted a continuous blowdown of boiler water containing no precipitate.

It will be apparent that the acrylic composition prepared in accordance with this invention is temperature stable with unique capacities for descaling and scale inhibition under the various conditions of scaling encountered in the use of disposal of water containing scale producing compounds.

What is claimed and desired to be secured by letters patent is:

1. A process for the inhibition of scale deposits upon a metallic surface comprising the steps of:
    a. Adding to an aqueous system from between about 1 p.p.m. and 50 p.p.m. of a composition consisting essentially of the product formed by the reaction at a temperature of from about 24°C to about 80°C in an inert solvent of 80 to 90 parts by weight acrylic acid, 7 to 15 parts by weight thioglycolic acid, and 1.5 to 5 parts by weight ammonium persulfate; and
    b. Circulating over and throughout said metallic surface the said aqueous system.

2. The process of claim 1 wherein the said scale comprises calcium carbonate and calcium sulfate.

3. The process of claim 2 wherein the said metallic surface is the internal metallic lining of boiler, evaporator and desalination vessels and conduits.

4. The process of claim 2 wherein the said metallic surface is the internal surface of a subterranen well.

5. The process of claim 1 wherein the said composition is neutralized to a pH of between about 5 and about 8 to produce a neutralized salt composition.

6. A process for the removal of scale deposits upon a metallic surface comprising the steps of:
    a. Adding to an aqueous system at least about 20 p.p.m. of a composition consisting essentially of the product formed by the reaction at a temperature of from about 24°C to about 80°C in an inert solvent of 80 to 90 parts by weight acrylic acid, 7 to 15 parts by weight thioglycolic acid, and 1.5 to 5 parts by weight ammonium persulfate; and
    b. Circulating over and throughout said metallic surface the said aqueous system at least until said scale is substantially removed from said metallic surface.

7. The process of claim 6 wherein the said composition is neutralized to a pH of between about 5 and about 8 to produce a neutralized salt composition.

8. The process of claim 6 wherein the said scale comprises calcium carbonate and calcium sulfate.

9. The process of claim 6 wherein the said metallic surface is the internal metallic lining of boiler, evaporator, and desalination vessels and conduits.

10. The process of claim 6 wherein the said metallic surface is the internal surface of a subterranean well.

* * * * *